J. CAMPBELL.
CINEMATOGRAPH FILM.
APPLICATION FILED SEPT. 23, 1912.
1,184,226.
Patented May 23, 1916.
3 SHEETS—SHEET 1.
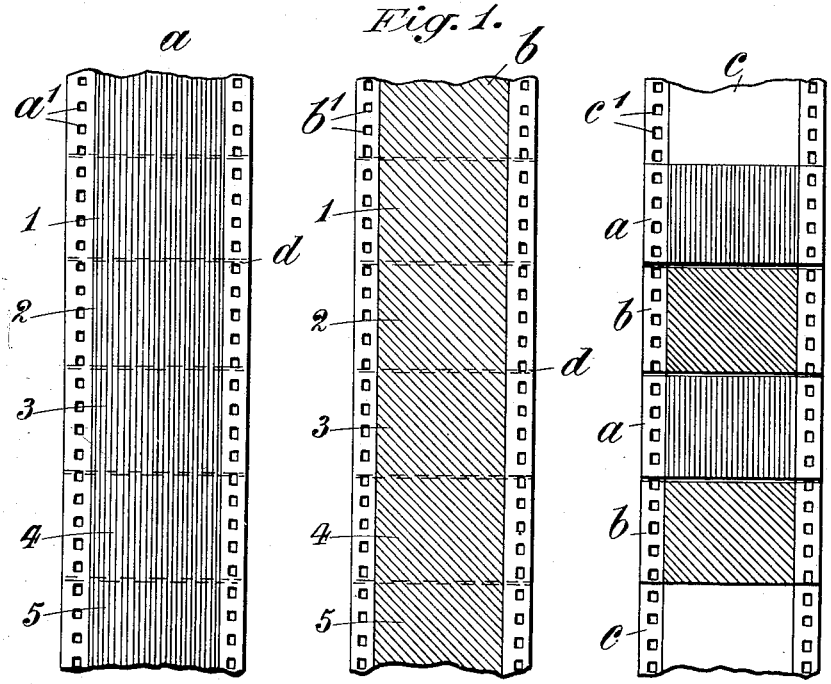

J. CAMPBELL.
CINEMATOGRAPH FILM.
APPLICATION FILED SEPT. 23, 1912.
1,184,226.
Patented May 23, 1916.
3 SHEETS—SHEET 2.
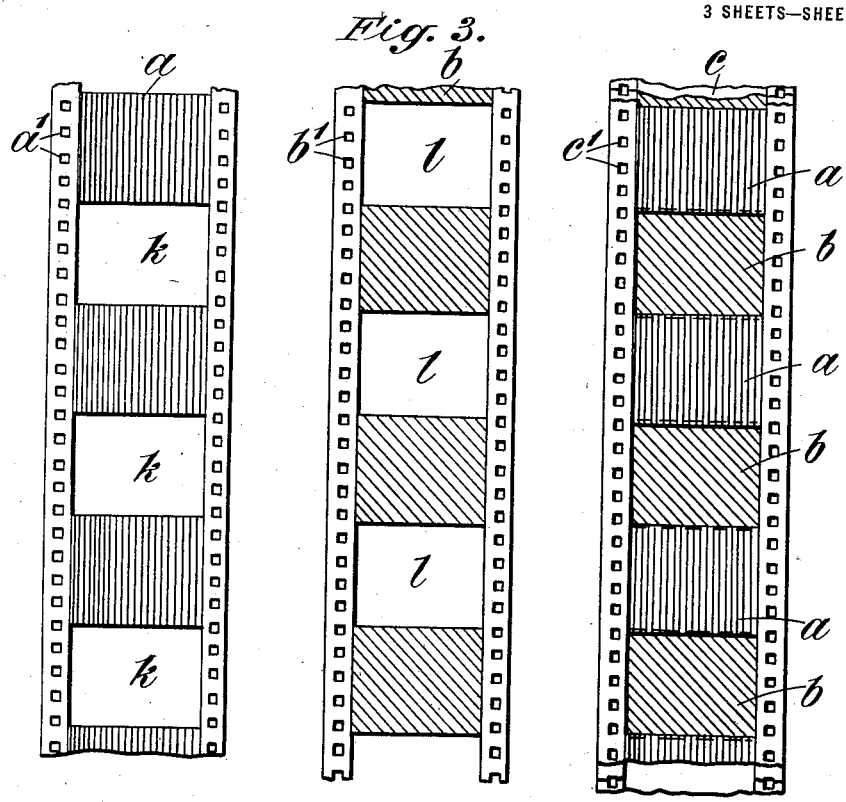
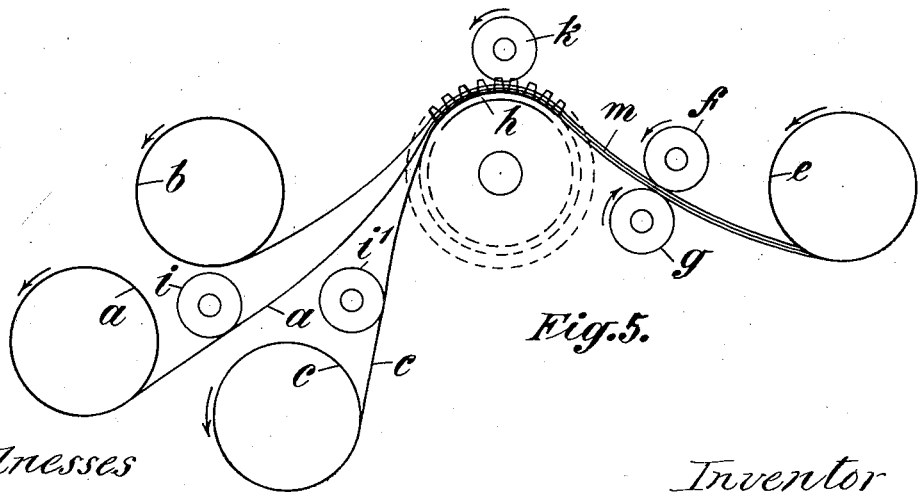
Witnesses
J. P. Hines.
C. C. Hines.
Inventor
John Campbell
by Connolly Bros
Attys

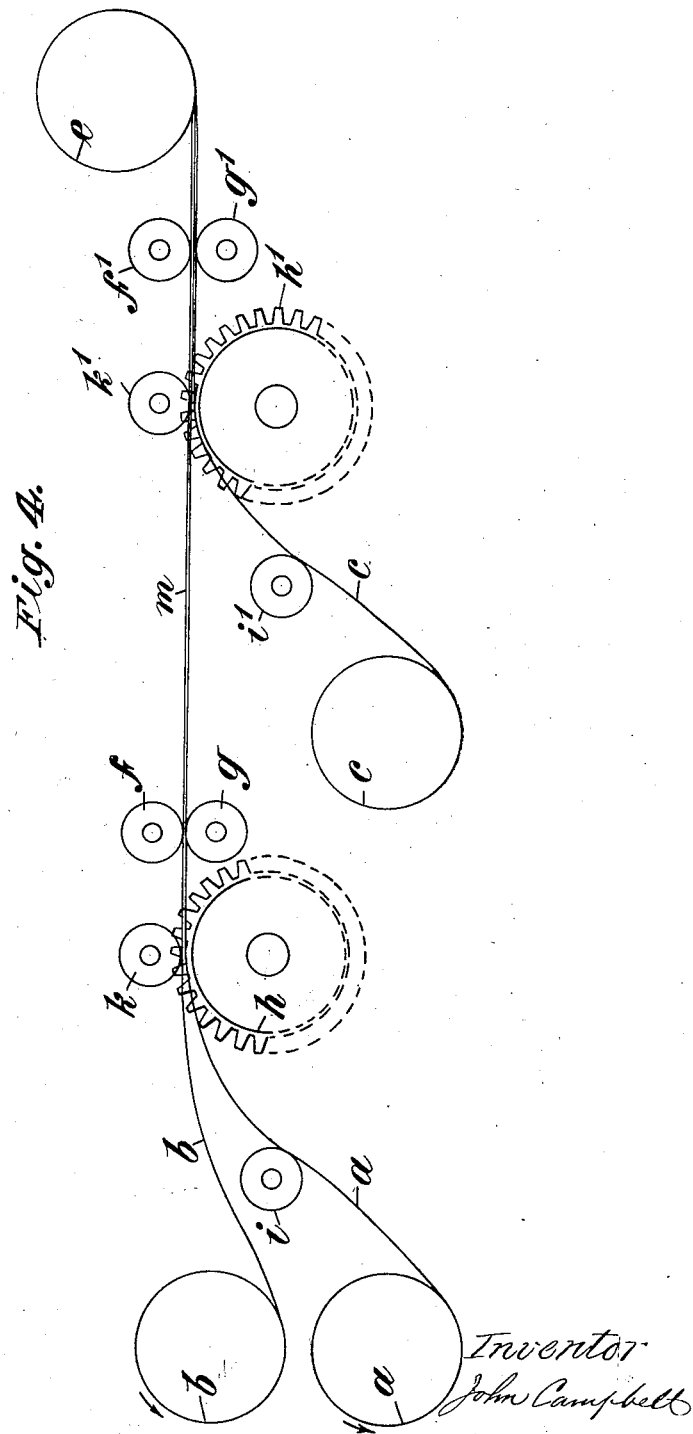

UNITED STATES PATENT OFFICE.

JOHN CAMPBELL, OF WIMBLEDON PARK, ENGLAND.

CINEMATOGRAPH-FILM.

1,184,226.  Specification of Letters Patent.  Patented May 23, 1916.

Application filed September 23, 1912. Serial No. 721,805.

*To all whom it may concern:*

Be it known that I, JOHN CAMPBELL, a subject of His Majesty the King of England, residing at 59 Gartmoor Gardens, Wimbledon Park, in the county of Surrey, Kingdom of England, have invented certain new and useful Improvements in or Relating to Cinematograph-Films for the Production of Colored Pictures, of which the following is a specification.

This invention relates to improvements in cinematograph films for the production of colored pictures and it refers more particularly to positive cinematograph films of the kind wherein the color screens for projection are integral with the positive film.

According to my invention I make the color screens part of the actual positive by adhesively fixing or attaching thereto in proper alternating or recurring order either, a plurality of separate transparent colored slips, films or screens of the required complementary color, or two or more continuous bands of complementary color which are suitably cut away or fenestrated in ladder-like fashion so as to expose through the spaces therein, when assembled, the next or adjacent screen or screens in the proper order in relation to the black and white pictures.

In describing my invention I will suppose for example a negative film has been taken through say alternate complementary green and red screens and a positive film printed therefrom in the ordinary manner. Then alternately the positive pictures may be said to represent respectively the green and red portions of the spectrum, which must be restored when projecting, before colored cinematography will result. I restore these screen colors by superimposing the proper transparent colors on the film itself. This may be done in various ways for example, by superimposing on the positive pictures by adhesion, using gum, dextrin, or other suitable transparent adhesive material, separate or continuous pieces of transparent material like gelatin, celluloid or the like, tinted throughout with complementary green or red, so as to coincide with the proper green or red representing positives.

The invention is hereinafter described with reference to the accompanying diagrams in which:—

Figure 1 shows detail views of the colored screens or films and the positive film to which they are to be attached. Fig. 2 is a diagram showing suitable apparatus for use in their manufacture; Fig. 3 is a similar view to Fig. 1 illustrating a modified method of manufacture; and Figs. 4 and 5 are similar views to Fig. 2, showing apparatus for use therewith.

For two colored cinematography these slips are conveniently prepared as follows: In Fig. 1 $a$ represents a film consisting of gelatin, celluloid or like material with which a color (say red) has been thoroughly incorporated while in the semi-liquid and plastic state by well known methods of manufacture. This film is the exact size of the ordinary cinematograph black and white positive film $c$ to be colored and is perforated at $a'$ along its side edges by the same machine as the positive film on which the slips have to be superimposed. By suitable joints the colored film may be made of any desired length. By means of a suitable machine this perforated film is cut across where indicated by the dotted lines $d$ giving slips the exact size of the cinematograph picture with lateral perforations $a'$ coinciding with the corresponding perforations $c'$ in the black and white positive $c$. Every alternate slip of the screen $a$, indicated by the even numbers 2, 4, etc., is rejected.

In a similar way the slips are cut from a green film $b$ perforated at $b'$ by the same machine as the red film $a$, but here the odd numbers are rejected. As the slips are cut they are alternated viz. odd red, even green, and so on until the films are all cut. I have now a series of colored slips 1, 2, 3, etc., alternately red and green. Before cutting the colored films they are registered as shown in Fig. 1 so that the appropriate slips of the colored screens coincide with the proper black and white positive picture as regards the perforations. The black and white positive $c$ is now run over a sprocket drum (Fig. 2) back upward, and as it is fed over the sprocket the appropriate slips from $a$ $b$ are also fed on to the corresponding positive pictures by hand or other suitable means, care being taken to see that the first colored slip used is accurately registered to its correct position on the positive film $c$ so that the perforations $a'$ $b'$ thereon correspond to the similar perforations $c'$ of the said positive film. It follows that all succeeding slips will then be in the proper sequence for adhesion to the positive film. The film is thus backed by complementary colored slips which are part and parcel of the film itself. In the suitable arrangement for this purpose shown in Fig. 2, $e$ indicates the film box receiving the finished film through the two rollers $f$ $g$ which move reversely, smoothing and fixing firmly the slips $a$ $b$ on the film $c$. A sprocket drum $h$ exactly coinciding with regard to the teeth in distance and size with the film perforating machine pulls the film $c$ over at a suitable rate, on to which the alternate red and green slips are fed. A roller $i$ lightly brushes on the film $c$ a minimum quantity of a transparent adhesive medium, as it is drawn from the film box $j$. A suitable guide roller $k$, the exact width of the inner part of the film, is arranged to press lightly on the slips as they are fed on the sprocket. If desired I might increase the length of the roller $k$ and form perforations in its ends which would coincide with the teeth on the sprocket drum and serve to press the film tightly thereon. The movement of the film box $e$ is such as to give a slight tension to the film as it leaves the sprocket drum. For three color work three separately colored films are prepared viz. violet-blue, red, and yellow-green, and are treated in a similar manner, but in the violet-blue film every second and third slips are rejected. In the red every first and third are rejected and in the yellow-green, every first and second. In the prepared slips I have thus alternately violet-blue, red, and yellow-green, and these are fed on the positive film truly registered as heretofore explained and in the proper sequence. I may also obtain the same result by superimposing by adhesion a transparent continuous film of a suitable material like gelatin, celluloid or the like of the exact size of the picture film and tinted alternately with squares or oblongs of complementary green and red in such a manner and size to exactly coincide with the proper positive pictures when laid over the positive film.

For two color cinematography the continuous colored film may be conveniently prepared as follows and is described with reference to Figs. 3 and 4. In Fig. 3 $a$ is the complementary red film and $b$ is the complementary green one. These are perforated as before on the same machine as the black and white positive $c$ so that the perforations coincide and the films $a$ and $b$ are registered in relation to the positive film $c$ as shown in Fig. 3 before being superimposed. In the red film $a$ every alternate picture area $k$ is cut out by a suitable machine, leaving the spaces open which correspond to the green positive pictures and in the green film $l$ in a similar way every alternate picture area is cut out so that open spaces correspond to the red positive pictures. The two films $a$ and $b$ are now first superimposed on each other to form a single film, then on to the positive film $c$ so that I obtain a positive black and white film backed alternately with red and green, the colors corresponding to the proper positive pictures. A suitable arrangement for this purpose is shown in Fig. 4 in which $a$ indicates the red film, $b$ the green film, and $c$ the black and white positive. A roller $i$ is employed to brush on the adhesive binding medium on the red film $a$. In this case $h$ represents the sprocket drum, $k$ the guide roller, $m$ the composite colored film, $f$ and $g$ pressing and smoothing rollers, $h'$ another sprocket drum for registering the composite colored film $m$ on the black and white film $c$. $f'$ $g'$ other pressing and smoothing rollers, and $e$ the film box for receiving the finished film.

Alternatively I may feed the three units viz. the red film, the green film, and the black and white positive over one and the same sprocket $h$ as in Fig. 5 giving the same result as heretofore described. In this figure of the drawings as before $b$ represents the green film perforated and cut as described, $a$ the red film and $c$ the black and white positive.

$i$ and $i'$ are rollers lightly brushing a minimum quantity of a transparent suitable adhesive material on the color screen $a$ and the film $c$. In this case $h$ represents the sprocket, $m$ the composite film, $f$ and $g$ the rollers moving reversely to press and smooth the film and $e$ the film box receiving the finished film.

The motive power is taken from the sprocket $h$ and film box $e$.

For three color cinematography I use in a similar way three colored screens or films, violet-blue, red, and yellow-green perforated in the way already described. These films are cut in the way explained as follows. In the violet-blue every second and third picture area is cut out by a suitable machine. In the red, every first and third is cut out, and in the yellow-green every first and second. These three screens are registered with the positive film so that the blue, green, and red areas correspond with their appropriate positive pictures and are then superimposed on the positive in the same way as already described in the two color composite film, except that three units form the single alternately colored film which is fed on to the sprocket over the black and white film. Alternatively the four units viz. blue film, red film, yellow-green film and black and white film may be fed simultaneously over one sprocket producing the same result as described heretofore in relation to two colors.

The colored films, both used for the separate slips and for the continuous films are made as thin as possible compatible with practical working. By either of these methods I obtain a composite film, consisting of the black and white positive, carrying at its back alternate colored areas appropriate to the particular positive pictures either for two color or three color natural color cinematography, the colored areas being adherent to but lying in a separate adjacent plane to that of the positive picture film and this composite film when run through an ordinary cinematograph projector, with sufficient speed (32 per second) without any additional parts for the production of colored light will give sheet pictures which when blended in the eye give the effects of pictures in natural colors.

What I claim as my invention and desire to secure by Letters Patent of the United States is:—

In positive film the combination with the black and white positive pictures thereof of transparent colored films formed from continuous bands which are perforated along their edges for the purpose described and stamped out in portions where not required so as to expose the colored portions of the next or adjacent screen or screens in their proper order when they are secured to the black and white positive.

In testimony whereof I have hereunto set my hand this 4th day of September, 1912.

JOHN CAMPBELL.

Witnesses:
J. S. ARTHERS,
Z. BLAKEY.